(12) United States Patent
Linnenbrink et al.

(10) Patent No.: US 9,157,238 B2
(45) Date of Patent: Oct. 13, 2015

(54) USE OF POLYOLEFIN MEMBRANES BEING COATED BY NON-REACTIVE HOTMELT ADHESIVES FOR SEALING

(71) Applicant: SIKA TECHNOLOGY AG, Baar (CH)

(72) Inventors: Martin Linnenbrink, Apensen (DE); Doreen Janke, Alveslohe (DE)

(73) Assignee: SIKA TECHNOLOGY AG, Baar (CH)

( * ) Notice: Subject to any disclaimer, the term of this patent is extended or adjusted under 35 U.S.C. 154(b) by 54 days.

(21) Appl. No.: 13/973,366

(22) Filed: Aug. 22, 2013

(65) Prior Publication Data

US 2013/0340368 A1 Dec. 26, 2013

Related U.S. Application Data

(63) Continuation of application No. 13/882,650, filed as application No. PCT/EP2011/072793 on Dec. 14, 2011, now Pat. No. 8,858,743.

(30) Foreign Application Priority Data

Dec. 17, 2010 (EP) .................................... 10195793

(51) Int. Cl.
*E04D 5/06* (2006.01)
*B32B 27/08* (2006.01)
*B32B 27/32* (2006.01)
(Continued)

(52) U.S. Cl.
CPC . *E04D 5/06* (2013.01); *B32B 27/08* (2013.01); *B32B 27/32* (2013.01); *E04B 1/66* (2013.01); *E04B 1/665* (2013.01); *E04D 5/148* (2013.01); *E04D 5/149* (2013.01); *Y10T 156/10* (2015.01)

(58) Field of Classification Search
CPC ........... E04D 5/02; E04D 5/148; E04D 11/02; E04B 1/665; B32B 27/32
USPC ............................................. 52/408, 409, 411
See application file for complete search history.

(56) References Cited

U.S. PATENT DOCUMENTS 2,036,123 A * 3/1936 Dahlander ...................... 52/411
5,422,179 A   6/1995 Dietschi et al.
(Continued)

FOREIGN PATENT DOCUMENTS

EP    1 728 807 A1   12/2006
EP    2 075 297 A1    7/2009
(Continued)

OTHER PUBLICATIONS

International Preliminary Report on Patentability issued in International Patent Application No. PCT/EP2011/072793 dated Jun. 18, 2013.

(Continued)

*Primary Examiner* — Christine T Cajilig
(74) *Attorney, Agent, or Firm* — Oliff PLC

(57) ABSTRACT

The invention relates to a process for sealing an above-ground or underground construction. In particular it involves the use of non-reactive hot melt adhesives and flexible polyolefin films. This procedure in particular has the advantages that good and long-lasting adhesion can be achieved very quickly, and that in particular by using polyolefin strips coated with non-reactive hot melt adhesives, insulating strips can be obtained simply which are non-tacky at room temperature and can be processed and bonded easily at the construction site.

8 Claims, 3 Drawing Sheets

Figure 1:
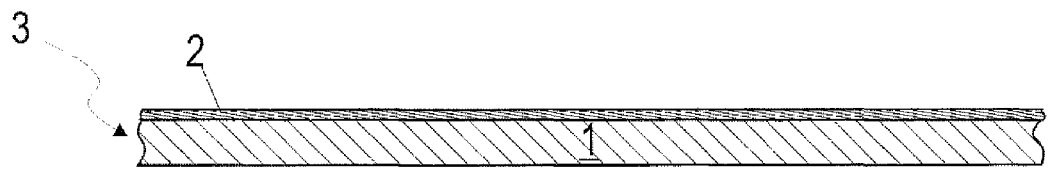

(51) Int. Cl.
*E04B 1/66* (2006.01)
*E04D 5/14* (2006.01)

(56) References Cited

U.S. PATENT DOCUMENTS

| | | | |
|---|---|---|---|
| 5,479,753 A * | 1/1996 | Williams | 52/741.4 |
| 6,901,712 B2 * | 6/2005 | Lionel | 52/408 |
| 8,084,527 B2 | 12/2011 | Paschkowski et al. | |
| 8,398,809 B2 | 3/2013 | Janke et al. | |
| 2004/0107662 A1 * | 6/2004 | Georgeau et al. | 52/408 |
| 2004/0115318 A1 * | 6/2004 | Janssen et al. | 426/124 |
| 2008/0217947 A1 * | 9/2008 | Merryman et al. | 296/39.1 |
| 2008/0250741 A1 * | 10/2008 | Bennett et al. | 52/506.01 |
| 2009/0142610 A1 | 6/2009 | Paschkowski et al. | |
| 2010/0307087 A1 * | 12/2010 | Zoellner | 52/309.3 |

FOREIGN PATENT DOCUMENTS

| | | |
|---|---|---|
| EP | 2 145 907 A1 | 1/2010 |
| JP | 09-072198 A | 3/1997 |
| WO | WO 01/02700 A1 | 1/2001 |
| WO | WO 2009/133093 A1 | 11/2009 |

OTHER PUBLICATIONS

U.S. Appl. No. 13/882,650 in the name of Linnenbrink et al. filed Apr. 30, 2013.

International Search Report issued in International Patent Application No. PCT/EP2011/072793 dated Jan. 24, 2012.

Nov. 20, 2013, Office Action issued in U.S. Appl. No. 13/882,650.

* cited by examiner

USE OF POLYOLEFIN MEMBRANES BEING COATED BY NON-REACTIVE HOTMELT ADHESIVES FOR SEALING

This is a Continuation of application Ser. No. 13/882,650 filed Apr. 30, 2013, which in turn is a National Phase Application, which claims the benefit of PCT Application No. PCT/EP2011/072793 filed Dec. 14, 2011, which in turn claims priority to European Patent Application No. 10195793.4 filed Dec. 17, 2010. The disclosure of the prior applications are hereby incorporated by reference herein in their entirety.

TECHNICAL AREA

The invention involves the area of sealing an above-ground or underground construction and the area of hot melt adhesives.

STATE OF THE ART

Polyolefin sealing films have been known for quite some time. They have been also used for a long time for sealing roofs and roof constructions. Traditionally, such films have been laid as adhesive strips on the roof and heat sealed together. To set such strips in place, till now primarily mechanical means of anchoring have been used to hold them in place, for example, nails. Naturally in this way assuring a watertight seal is a great problem.

However, polyolefin sealing films are difficult to glue. Existing systems are very expensive and therefore have a lot of disadvantages. Until now reactive hot melt adhesives have been used for gluing polyolefins, as revealed in WO 2009/133093 A, where up to now reactive hot melt adhesives based on silanized grafted poly-α-olefins have been used. These adhesives are however very expensive.

Presentation of the Invention

The task of this invention is to make available a process that allows sealing an above-ground or underground construction reliably and in a cost-efficient manner.

Surprisingly, it has been found that a process according to claim 1 is able to resolve this task. In particular, this process allows the realization in a very simple manner of a long-fostered desire for full surface long-term gluing of a flexible polyolefin strip to a substrate, in particular a roof or a roof construction, and thereby to obtain optimal sealing. Surprisingly, it has been found that non-reactive hot melt adhesive compounds are best suited for the solution of this problem. It has been shown as especially advantageous that with such non-reactive hot melt adhesive compounds, coated flexible polyolefin foils are non-tacky and thereby can be stored over a long period, particularly in the form of rolls. When needed, they can be bonded with the substrate to be sealed by introducing heat and subsequent cooling, binding the substrate to be sealed to the substrate, so that as a result a coated connecting body can be formed. It has been shown that this process very quickly leads to an adhesive bond, so that after a few minutes strong forces can be transferred between the polyolefin strip and the substrate glued to it. This rapid buildup of tightness is thoroughly advantageous so that no mechanical fixing means such as clamps or something similar are needed for the adhesion. In addition, the non-reactive hot melt adhesive compounds suited for this invention are significantly less expensive than reactive hot melt adhesive, which has been used in the state of the art for gluing polyolefins prior to this time.

The sealing films revealed in this document can be easily produced, stored and shipped over a long period, and in a very simple way can be laid and glued. In particular, no mechanical fastening means, such as nails or the like, are needed for laying and fixing. This reduces the vulnerability of films to damage. Consequently sources of leakiness are greatly reduced.

Other aspects of the invention are the subject of other independent claims. Especially preferred embodiments of the invention are the subject of dependent claims.

Paths to Execution of the Invention

In a first aspect, this invention involves a process for sealing an above-ground or underground construction. This process includes the following steps:
a) Coating a flexible polyolefin sealing film with a non-reactive hot melt adhesive compound to form a hot melt adhesive coated polyolefin sealing film, which is non-tacky at 25° C.;
b) Laying the hot melt adhesive coated polyolefin sealing film on the surface of an above-ground or underground construction;
c) Adding heat to begin to melt the non-reactive hot melt adhesive compound;
d) Cooling the non-reactive hot melt adhesive compound by forming an adhesive bond between the flexible polyolefin sealing film and the upper surface of the construction.

In this document "sealing film" is understood to mean flexible, that is bendable, flat plastic, particularly in a thickness from 0.05 millimeters to 5 millimeters, which can be rolled up. Thereby, in addition to films in the strict sense of thickness under 1 millimeter, and preferentially sealing strips, are understood to be those that are used as they are typically for sealing tunnels, roofs, and swimming pools in a thickness of typically 1 to 3 mm, and in special cases even in a thickness of up to 5 mm. Such films are usually created by brushing on, pouring, glazing, or extruding, and are typically available commercially in rolls or are created on the spot. They can be made of a single layer or of several layers. It is clear to the person skilled in the art that films can contain additional materials and processing agents, such as fillers, UV and heat stabilizers, softening agents, release agents, biocides, fire prevention agents, antioxidants, pigments such as titanium dioxide and acid soot, and dyes. This means that in this document films are designated as polyolefin films that do not consist of 100% polyolefin.

In particular, flexible polyolefin sealing films or flexible sealing films are suited for the area of sealing buildings with standard polyolefin sealing film. Such polyolefin films contain in particular softening agents.

Flexible polyolefin sealing films are based on flexible polyolefins, known to the person skilled in the art as "FPO". Such flexible polyolefins are homopolymers or copolymers of olefins, in particular of ethylenes and propylenes. In order to be able to be used in practice as a sealing film, it is important that these polyolefins be flexible. The use of rigid polyolefins would lead to a situation that in bending or reverse bending of the film, such as in applying the film and in use, such as through fluctuations in temperatures, mechanical loads, or for example in walking or driving over the film, these might break or at least be torn, whereby the sealing function could no longer be assured. In addition, it is inevitable in practice that the sealing foil must be delivered to the construction site in roll form. A rigid polyolefin however cannot be rolled.

In order to optimize the mechanics of the flexible polyolefin sealing film, it is advantageous if the sealing film is reinforced with fibers. It is particularly advantageous if the polyolefin sealing film is reinforced with fibers. Reinforcement with fibers can take place in the form of loose fibers or, preferentially, through flat fiber objects. Preferentially reinforcement by fibers occurs in a way that the polyolefin sealing film is reinforced with a fiber mat, a fiber layer, a fiber fleece, a fiber grid layer, or a fiber cloth.

It is preferred that the flexible polyolefin sealing film be reinforced with a cloth.

Particularly suited as fibers are fibers of glass, hydrocarbon, cellulose, cotton, or synthetic plastics, preferentially fibers of polyester or of a homopolymer or copolymer of ethylenes and/or propylenes or of viscose. According to the outer form, the fibers may be used as short fibers or long fibers, or in the form of spun, woven, or unwoven fiber materials. The use of fibers is in particular advantageous for improving the mechanical strength, in particular when at least a portion of the fibers are made of high tensile strength or extremely high tensile strength fibers, in particular of glass or aramide fiber. Preferentially fibers are glass fibers or polyester fibers.

Particularly preferred are flexible polyolefin sealing films that are reinforced with a glass fiber mat and/or glass or polyester mats.

Especially appropriate flexible polyolefin sealing films are those from Sika Sarnafil AG, Switzerland, in the product lines Sarnafil® TG and Sarnafil® TS, especially Sarnafil® TS 77-15, TS 77-18, and TS-20, and the product lines Sikaplan® WT.

Underground and above-ground constructions are in particular buildings, houses, supporting walls, roofs, tunnels, and bridges. Especially preferred as underground or above-ground construction are roofs, in particular flat roofs.

In this document, "non-reactive" hot melt adhesive compound means a hot melt adhesive compound that has no polymers that chemically react with each other either at room temperature or at the melting point and that would lead to a higher molecular species. Such non-reactive hot melt adhesive compounds in particular have polymers with no isocyanate, alkoxysilane, epoxide, or (meth)acrylate groups.

The non-reactive hot melt adhesive compound thereby contains no epoxy resin, in particular no epoxy hard resin.

In this document "hot melt adhesive compound" means a compound that is solid at 25° C. and that melts upon heating to the melting point and is thereby a liquid. Such a hot melt adhesive compound can be applied to a substrate at an application temperature that lies above the melting point of the hot melt adhesive compound, and that upon cooling becomes solid again and thereby builds adhesive strength with the substrate. Based on the fact that in this invention a non-reactive hot melt adhesive compound is involved in the hot melt adhesive compound, the hot melt adhesive compound melts upon heating to the melting point, whereby the adhesive compound is again released.

In this document "room temperature" is understood as 25° C.

In this document "melting point" is measured at the softening point under the ring and ball method in accordance with DIN EN 1238.

In this document "to adhere by melting" or "adhesion by melting" means heating the hot melt adhesive compound to a temperature that lies above what is called the crossover temperature ("$T_{crossover}$") and that lies below a softening point, measured according to the ring and ball method in accordance with DIN EN 1238.

The crossover temperature, often called the flow boundary, stands for that temperature at which the curves of the loss module and the memory module intersect, measured by DTMA (Dynamic-Mechanical-Thermal Analysis). In this invention, the determination of the crossover temperature using the DTMA measurements uses the following DTMA measurement parameters:

Device: Anton Paar MCR 300 SN 616966
Software US V2.3
Stamp: 25 mm plate (flat surface)
Measurement split: (sample thickness) 1 mm
Temperature ramp: 200° C.-90° C. with −1° C./min
Frequency of oscillation: 1 Hz
Gamma amplitudes: 1% (corresponds to 0.8 mrad)

Adhesion by melting typically occurs at a temperature that is substantially below the softening point, meaning at least 20° C., in particular at least 30° C., and preferentially at least 40° C.

In step a) of the process, the flexible polyolefin sealing film is coated with a non-reactive hot melt adhesive compound.

For this purpose the non-reactive hot melt adhesive compound is heated above the melting temperature, so that the hot melt adhesive compound becomes fluid and at the application temperature is applied to the flexible polyolefin sealing film.

The melting temperature of the hot melt adhesive compound should be as high as possible so that it lies above the temperature occurring in the use of the sealing film. For the sealing of an underground or above-ground construction, it is thus preferred that the melting temperature of the non-reactive hot melt adhesive compound lie between 80 and 200° C., in particular between 130 and 180° C.

The application temperature is typically chosen so that the viscosity of the melted hot melt adhesive compound follows a good application with the application devices generally used with hot melt adhesives. Thereby the application temperature is chosen so that the viscosity is preferentially between 1500-40,000 mPa·s, measured according to Brookfield Thermosel. If too high an application temperature is used, the adhesive or the flexible polyolefin sealing film can thermally cause damage to an unacceptable extent. Thereby the application temperature preferentially is below 200° C., preferentially below 190° C.

The application of the melted on non-reactive hot melt adhesive compound occurs on the flexible polyolefin sealing film at the above-described application temperature, preferentially through squeezing on, spraying on, painting on, stamping on, rolling on, pouring on, brushing on, rolling on, dipping, or extruding on.

Application of the multiple and non-reactive hot melt adhesive compound onto the flexible polyolefin sealing film does not necessarily take place on a previously manufactured flexible polyolefin sealing film, but can occur directly in the manufacture of the flexible polyolefin sealing film, such as through extruding flexible polyolefin and non-reactive hot melt adhesive compound simultaneously. Thereby such a simultaneous extrusion of flexible polyolefin and non-reactive hot melt adhesive compound can be understood as "coating of a flexible polyolefin sealing film" in the sense of this invention.

Applying the non-reactive hot melt adhesive compound can take place completely flat, on a grid, or with a special mold.

A hot melt adhesive coated polyolefin sealing film is created by applying the non-reactive hot melt adhesive compound and is non-tacky at 25° C.

In order to accelerate the rapid cooling off to room temperature, the applied non-reactive hot melt adhesive compound can be cooled with a cooling agent, such as by blowing with cold air or by cooling the film through laying the film on a pre-cooled or actively cooling body or bonding it with this cooling body.

The hot melt adhesive coated polyolefin sealing film created in this way can now as needed be trimmed, cut, rolled up, or further directly processed. The rolls of the coated plastic films can now be stored or transported as needed.

Step a) occurs preferentially in an industrial process in a film plant, where the hot melt adhesive coated polyolefin sealing film gets to the construction site preferentially for use in the form of hot melt coated polyolefin sealing film from a roll. It is especially advantageous that application of the non-reactive hot melt adhesive compound does not occur at the construction site, something that is very advantageous from the viewpoint of work and technical safety due to the high application temperatures and the related danger of fire and burns. In addition, one must not wait at the construction sites until the hot melt compound is applied and cooled, thereby allowing greatly accelerated work at the worksite. Based on the property that the hot melt compound coated polyolefin sealing film is non-tacky, the coated film can be simply rolled up, stored in a space-saving manner, transported, and unrolled as needed. Preferentially individual layers on the roll do not adhere to one another, meaning that preferentially no blocks in the rolls occur while in storage, in particular in long-term storage In certain, non-preferred cases. It can however be indicated that by laying down a separating paper, in particular a siliconized separating paper, onto the coated film before rolling, blocking can be completely avoided.

Non-reactive hot melt adhesive compounds are solid at room temperature, and melt at heating above the melting point, becoming fluid. To be precise, one cannot speak of a "melting point" for a polymer. That is why in this document "melting point" is understood to be measured at the softening point under the ring and ball method in accordance with DIN EN 1238. The melted hot melt adhesive compounds are typically applied at a temperature that is higher than the softening point, typically at least 20° C. higher. This temperature, called the "application temperature", typically lies between 140 and 200°, between 150 and 180° C. At the application temperature, the adhesive has a viscosity that allows a simple application. The viscosity, determined according to Brookfield Thermosel, preferentially amounts in this temperature to 1500-50,000 mPa·s. If it is much higher, the application is very difficult. If it is much lower, the adhesive is so thin that it runs off during application from the material surface to be glued before it becomes fast due to cooling off. Particularly preferred in a temperature area of 150 to 180° is a viscosity of 2500-20,000 mPa·s, measured according to Brookfield Thermosel.

Non-reactive hot melt adhesive compounds that are not appropriate are those that are tacky at 25° C. Whether and hot melt adhesive compound is tacky or not can be easily determined by momentarily pressing the surface with a finger. In doubtful cases, powdered chalk can be spread on the surface of a non-reactive hot melt adhesive at 25° C.; then the surface is tipped so that the powdered chalk falls off. If the remaining powdered chalk on the surface visually remains stuck, the adhesive is considered tacky.

Preferred embodiments of hot melt adhesive compounds in preferred embodiment are those that have a 25° C. hard thermoplastic poly-α-olefin, preferentially an atactic poly-α-olefin (APAO), in particular weighing more than 50%, preferentially more than 60%, in relation to the non-reactive hot melt adhesive compound.

This document understands "α-olefin" in the standard definition of an olefin of the formula $C_xH_{2x}$ (x corresponds to the number of carbon atoms), which has a C—C double bond on the first carbon atom (α-carbon). Examples of α-olefins are ethylene, propylene, 1-butane, 1-pentane, 1-hexane, 1-heptane, and 1-octane. Consequently, for example, 1.3 butadienes, 2-butanes, and styrol are not α-olefins in the sense of this document.

In this document, "poly-α-olefins" are understood in the standard definition as homopolymers of α-olefins and copolymers of several different α-olefins. Atactic poly-α-olefins (APAO) have an amorphous construction in comparison to other polyolefins. Preferentially these atactic poly-α-olefins have a softening point of over 90° C., in particular between 90° C. and 130° C. The molecular weight $M_n$ amounts to in particular between 7,000 and 25,000 g/mol. Particularly preferred atactic poly-α-olefins are obtainable under the commercial name Vestoplast® from Degussa.

Particularly preferred are propylene-rich atactic poly-α-olefins and partially crystalline propylene-ethylene-butylene terpolymers.

In another embodiment, the non-reactive hot melt adhesive compound has a copolymer solid at 25° C., which is obtained from a radical polymerization of at least 2 monomers with at least one, preferentially one, unsaturated C═C double bond, preferentially an ethylene-vinyl acetate copolymer, in particular in an amount of more than 50% by weight, preferentially more than 60% in relation to the amount of the non-reactive hot melt adhesive compound.

Ethylene-vinyl acetate copolymers (EVA) have proved to be preferred, in particular those with a vinyl-acetate proportion of under 50%, in particular with a vinyl-acetate proportion between 10 and 40%, preferentially 15 to 30%.

The non-reactive hot melt adhesive compound also contains advantageously polyolefins, at 23° C. solid hydrocarbon resins, soft resins like polyolefins stuffed with maleic acid, and UV and/or heat stabilizers.

A hydrocarbon resin solid at 23° C. preferentially has a softening point of 100 to 140° C., in particular between 110 and 130° C. It has been shown to be especially advantageous if the percentage of all the hydrocarbon resins solid at 23° C. is a maximum weight of 20%, in particular a maximum of 16%, preferentially between 10 and 16%, in relation to the hot melt adhesive compound.

A soft resin has a softening point between −10° C. and 40° C. Based on the fact that the soft resin (WH) at room temperature (23° C.) is quite close to the melting or softening point, at room temperature it is already fluid or very soft. A soft resin can be a natural resin or a synthetic resin. In particular, such soft resins are medium to higher molecular compounds made of the classes of paraffin, hydrocarbon resins, polyolefins, polyesters, polyethers, polyacrylics, and amino resins. The soft resin preferentially has a melting point or softening point between 0° C. and 25° C., in particular 10° C. and 25° C. The soft resins are used only in small amounts. Preferentially, the percentage of all soft resins is a maximum weight of 20% in relation to the hot melt adhesive compound.

Polyolefins stuffed with maleic acid are especially preferred since they are advantageous in adhesion. It has been shown as particularly advantageous that such polyolefins stuffed with maleic acid are polypropylenes stuffed with maleic acid, in particular with a molecular weight between 7,000 and 14,000 g/mol. It has shown to be especially advantageous if the percentage of all the polyolefins stuffed with maleic acid is a maximum weight of 20%, in particular a maximum of 15%, preferentially less than 10%, in relation to the hot melt adhesive compound.

Furthermore, the non-reactive hot melt adhesive compound can have other ingredients. Appropriate for other ingredients are in particular ingredients that are selected from the group including softeners, adhesion promoters, UV absorption agents, UV and heat stabilizers, optical brighteners, fungicides, pigments, dyes, fillers, and drying agents.

The non-reactive hot melt adhesive compound preferentially has a melting point of 80 to 200° C., in particular from 130 to 180° C., measured as a softening point according to the ring and ball method in conformity with DIN EN 1238.

The amount applied in step a) to non-reactive hot melt adhesive compounds typically amounts to between 50 and 300 g/m$^2$, in particular from 100 to 200 g/m$^2$, preferentially 100 to 150 g/m$^2$. The thickness of the coat of the non-reactive hot melt adhesive compound preferentially amounts to between 50 and 500 micrometers, in particular between 50 and 100 micrometers.

In this process, in a step b) following step a), the hot melt compound coated polyolefin sealing foil is laid on the surface of an underground or above-ground construction. Laying the coated film occurs in a way that the non-reactive hot melt adhesive compound is situated between the flexible polyolefin sealing film and the surface of the construction.

The film is movable on the surface due to the lack of tackiness of the hot melt adhesive coated polyolefin sealing film. However, based on the weight of the polyolefin sealing film coated with the adhesive, a certain minimum force is required for this moving. This is therefore an advantage because an undesired move can thus be prevented. For example, on inclined surfaces an undesired move or unwinding because of slight winds can be in the main prevented. The minimum force required for moving can be adjusted with the choice of the additional materials (e.g., fillers), or the thickness of the film; otherwise the surface construction of the hot melt adhesive coated polyolefin sealing film can be decisively affected by the adhesive friction. For example, the adhesive friction can be increased by a coarse adhesive surface, which for example is a result of an uneven application of adhesive or adhesive applied using a grid.

The surface of the construction can exist of various materials. In particular, such surface construction materials are concrete, plaster, stone, brick, mortar, fiber cement, and natural stone such as granite or marble; metals or alloys such as aluminum, steel, non-ferrous metals, and galvanized metals; wood, insulation foam, polyisocyanurate resins (PIR); coated substrata such as coated metals or alloys; and dies and varnishes. Particularly preferred are materials that are used as a roof under layer.

As needed, the substrata can be pre-treated before applying the adhesive or the sealing material. Such pre-treatments include in particular physical and/or chemical cleaning processes, for example, polishing, sandblasting, brushing, or similar methods, or treating with cleaning agents, solvents, or applying an adhesive agent, an adhesive solution, or a primer.

In one embodiment of the invention, as in the described process, the coated surface 4 of an underground or above-ground construction 5 is coated with a hot melt adhesive, as obtained with a supplemental step a'):

a') Applying a non-reactive hot melt adhesive compound 2 to the surface 4 of an underground or above-ground construction 5.

It is crucial here that that step a') takes place before step b).

In another step c) of the process, heat is introduced so that the non-reactive hot melt adhesive compound adheres by melting.

Introducing heat in step c) occurs preferentially in a way that the temperature of the hot melt adhesive compound does not exceed a temperature of a minimum of 30° C., preferentially at least 40° C., below the melting point, meaning below the softening point of the hot melt adhesive compound.

Introducing heat can preferentially occur in step c) during the application of the hot melt adhesive coated polyolefin sealing film 3 in step b), in particular into the split 6 formed during the application between the hot melt adhesive coated polyolefin sealing film 3 and the surface 4 of a construction 5.

In another embodiment, the application of heat occurs in step c) to the side of the polyolefin sealing film 1 placed opposite the hot melt adhesive compound 2, and is transferred through the polyolefin sealing film 1 (straight through) to the hot melt adhesive compound 2.

The introduction of heat can occur through hot air, flame, induction, or dielectric heating. The introduction of the heat occurs preferentially in a way that the heat does not thermally negatively affect or destroy the film, the adhesive, or the material of the surface of the construction.

In this way, so that the hot melt adhesive compound adheres by melting, the hot melt adhesive compound is at least partially liquid, whereby an inner bond to the surface of the construction is assured.

The heating of the adhesive thereby occurs in particular at an adhesive temperature of 70 to 130° C.

In a step d) that comes after step c), the hot melt adhesive compound 2 is cooled off and forms an adhesive connection between the flexible polyolefin sealing film 1 and the surface of the construction 5. This cooling typically occurs without other supporting agents. In certain cases, however, it can be applicable and advantageous if the cooling should be accelerated so that for example the film after a short time is supposed to bear a load or be walked on. This can for example occur by having a cooling agent cool the film or the construction, such as a blast, particularly a blast of air.

Through this process as described the underground or above-ground construction is sealed. This sealing is in particular a sealing against water, in particular against rain water or construction water. With this process constructions can be reliably sealed for long periods of time, typically several years, in particular more than 10 or 20 years.

This occurs with the use of a non-reactive hot melt adhesive coated flexible polyolefin sealing film 3, which is non-tacky at 25° C.; this represents another aspect of sealing an underground or above-ground construction.

Finally, a coated connecting body 8 forms another aspect of this invention.

This coated connecting body 8 has
i) a layer of polyolefin sealing film 1
ii) a layer of a hot melt adhesive compound 2
iii) an underground or above-ground construction 5.

The layer of the hot melt adhesive compound 2 is in this case set between the layer of the polyolefin sealing film 1 and the underground or above-ground construction 5.

In this case the underground or above-ground construction 5 is in particular a roof.

SHORT DESCRIPTION OF THE DRAWINGS

In the following the invention will be more closely described with the aid of figures of preferred embodiments, whereby it is noted that only the basic elements for direct understanding of the invention are shown. Equivalent elements in the various figures are labeled with equivalent labels. It is also pointed out that the figures indicated here are schematic representations without size relationships.

Figure 2:
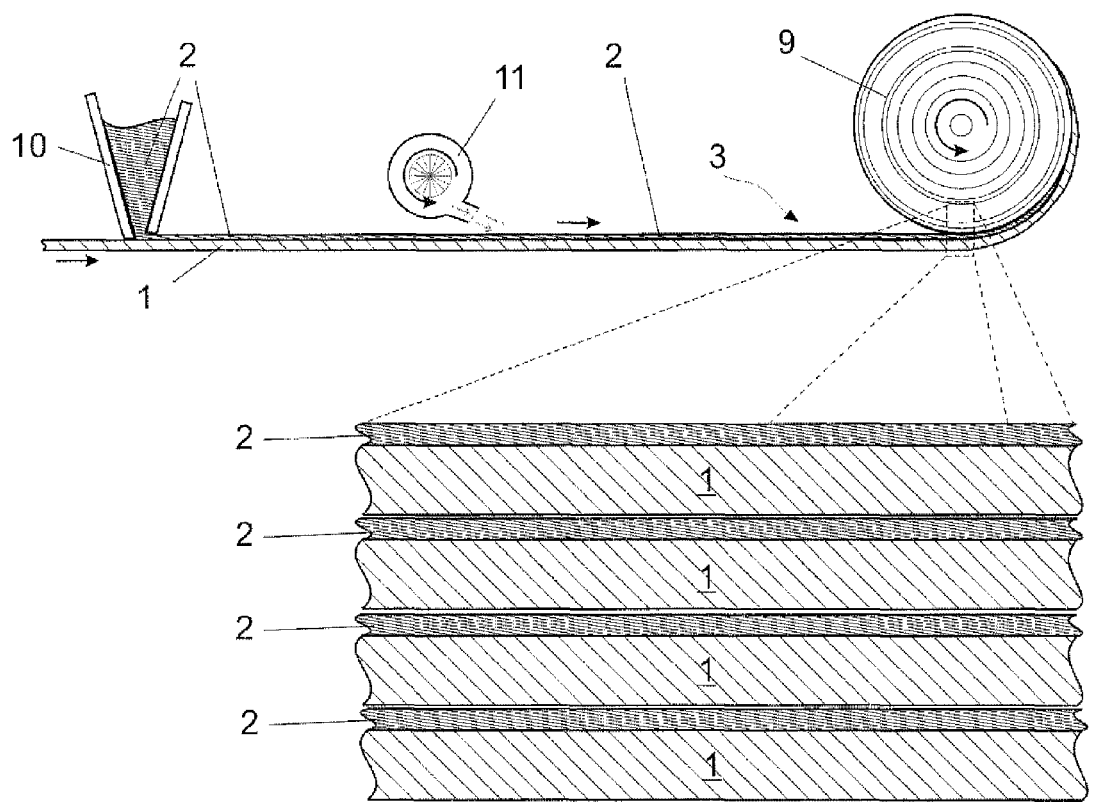
Figure 3:
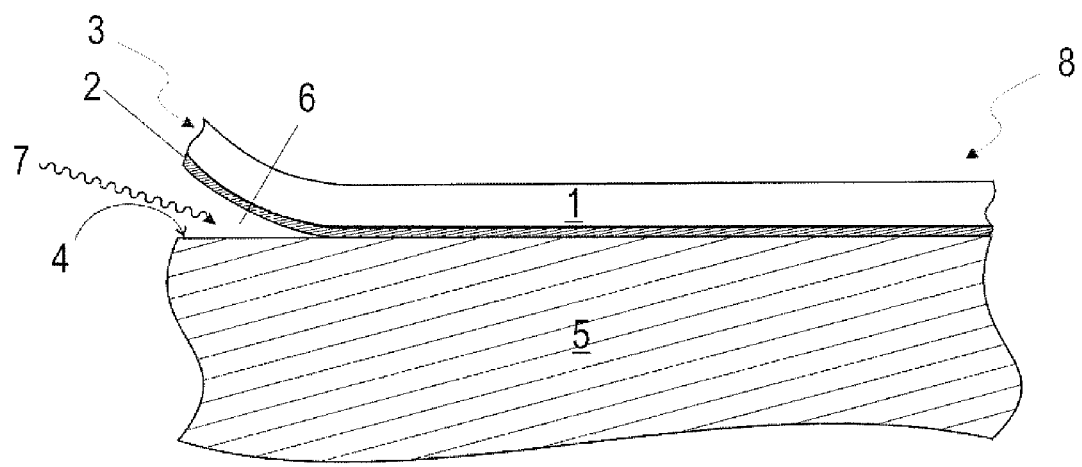
Figure 4:
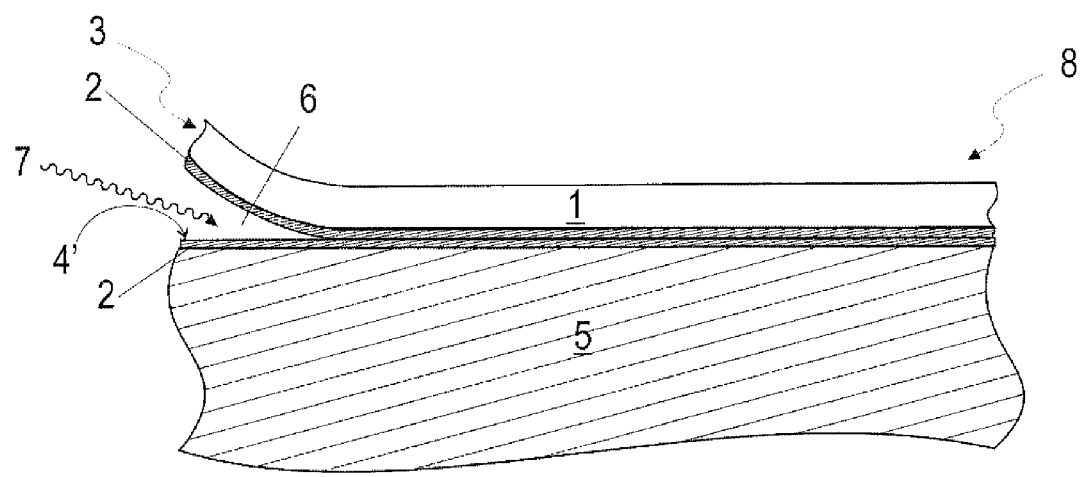
Figure 5:
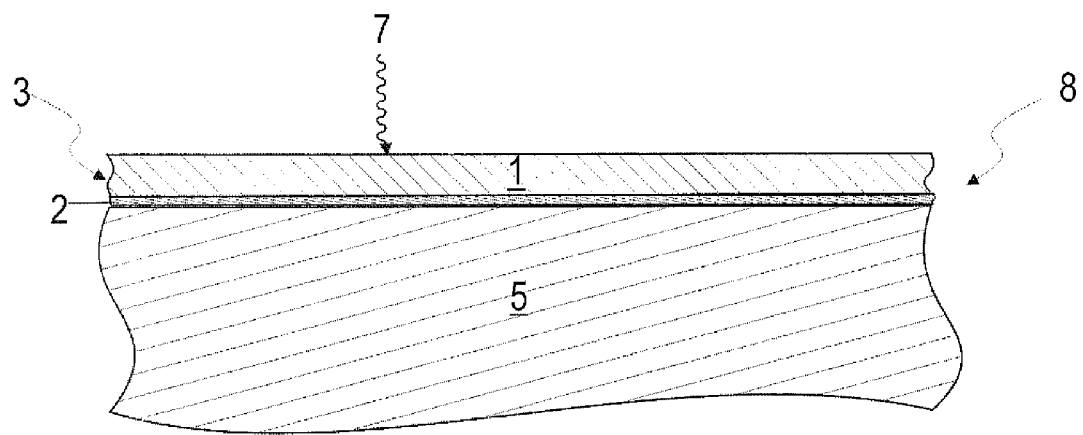

They show:

FIG. 1 a schematic cross-section through a flexible polyolefin sealing film or sealing strip, onto which a non-reactive hot melt adhesive compound is applied;

FIG. 2 a schematic representation of a manufacturing process of a hot melt adhesive coated polyolefins sealing film; cross-section through a hot melt adhesive coated polyolefin sealing film rolled up into a roll;

FIG. 3 a schematic cross-section through a coated connecting body after its manufacture in a first embodiment;

FIG. 4 a schematic cross-section through a coated connecting body after its manufacture in a second embodiment;

FIG. 5 a schematic cross-section through a coated connecting body after its manufacture in a third embodiment;

The following figures schematically show individual stages of a process to seal an underground or above-ground construction:

FIG. 1 shows a flexible polyolefin sealing film 1, on which a non-reactive hot melt adhesive compound 2 has been applied to a flexible polyolefin sealing film 1 in step a), and has been coated with the formation of a hot melt adhesive coated polyolefin sealing film 3, which is non-tacky at 25° C. The lack of tackiness makes it possible for the adhesive or the foil to be rollable without any problem, as described in FIG. 2. In addition, the film is freely movable and does not stick in an undesirable way to an undersurface; it is therefore advantageous that dust or other small particles do not remain stuck to the surface and thereby contaminate the surface of the film or give it a negative optical effect.

FIG. 2 shows that the hot melt adhesive coated polyolefin sealing film 3 or sealing strip 3 can be rolled up into a roll 9. In the schematic presentation shown here, the hot melt adhesive compound 2 is melted and by means of an application device 10, for example a wide slit jet applicator, is applied to the flexible polyolefin sealing film 1. In this way the polyolefin sealing film is moved under the applicator 10. Typically the polyolefin sealing film is unrolled from a roll (not shown). In order to assure faster cooling to room temperature, a cooling agent 11 (for example, an air blast) is then applied to the material in the embodiment shown here. FIG. 2 also shows that the manufactured hot melt adhesive coated polyolefin sealing film 3 is rolled up in this way. Moreover, in the lower part of FIG. 2 an enlarged schematic cutout of a roll 9 is shown with hot melt adhesive coated polyolefin sealing film 3. By rolling up the coated sealing film, the individual layers of the rolled up hot melt adhesive coated polyolefin sealing film 3 are in direct contact with one another and in particular have no intermediate layers of a separating paper. The hot melt adhesive coated polyolefin sealing film 3 can if needed be unrolled without blocks from the roll 9, even after a long storage or transport time. The roll 9 can be stored over long periods of time and transported in a space-saving manner, and if needed unrolled at the film plant or at the construction site, and in any case trimmed to the desired strip length.

In the embodiment shown here, the rolling takes place without the use of a siliconized separating paper, which would be laid on the adhesive when rolling up and which would then prevent individual layers in the roll from sticking to each other.

FIGS. 3 and 4 show steps b) and c) of the process.

A first embodiment is shown in FIG. 3. Here in step b) the hot melt adhesive coated polyolefin sealing film 3 is laid on the surface 4 of the underground or above-ground construction 5. Due to the lack of tackiness of the film, it can be moved on the surface 4, whereby for example a final positioning of the film is made possible. Because of the weight of the film, the film has a certain inertia, and in particular extensively prevents undesired movement, for example through shaking or the effect of the wind. Moreover, FIG. 3 shows a variant of step c). Here the introduction of heat in step c) occurs through laying on the hot melt adhesive coated polyolefin sealing film 3 in step b) into the split 6 formed during the laying down between the hot melt adhesive coated polyolefin sealing film 3 and the surface 4 of a construction 5. Because of the heat, adhesion occurs by melting of the hot melt adhesive compound 2. Thereby the hot melt adhesive compound becomes soft or lightly tacky and can bond with the surface 4 of the construction. In the next step d), the hot melt adhesive compound 2 again cools down, whereby an adhesive connection occurs between the flexible polyolefin sealing film 1 on the surface of the construction 5; as a result a coated adhesive connection 8 is formed. This coated adhesive connection 8 has a layer of polyolefin sealing film 1, a layer of a hot melt adhesive compound 2, and an underground or above-ground construction 5. The layer of the hot melt adhesive compound 2 is in this case set between the layer of the polyolefin sealing film 1 and the underground or above-ground construction 5.

FIG. 4 shows a second embodiment. Essentially this corresponds to FIG. 3, except that the surface 4 of the construction shows a surface 4' coated with a hot melt adhesive compound 2. Such a surface 4' is obtained before laying down with the additional step a'). In step a'), a non-reactive hot melt adhesive compound 2 is applied to the surface 4 of then underground or above-ground construction 5, and then step b) is applied.

FIG. 5 shows a third embodiment. Hereby the heat is introduced using a heat source 7 in step c) onto the side of the polyolefin sealing film 1 opposite the hot melt adhesive compound 2, and is transferred through the polyolefin sealing film 1 onto the hot melt adhesive compound 2. Due to the heat, adhesive melting occurs of the hot melt adhesive compound 2. Thereby the hot melt adhesive compound becomes at least partially fluid and can bond with the surface 4 of the construction. In the next step d), the hot melt adhesive compound 2 is cooled once again, whereby an adhesive compound between the flexible polyolefin sealing film 1 and the surface of the construction 5 occurs; as a result, as described in FIG. 4, a coated connecting body 8 is formed.

EXAMPLES

In the following, the invention will be illustrated on the basis of examples.

A flexible polyolefin sealing film Sarnafil® TS 77-18, reinforced with a polyester grid, obtainable from Sika Sarnafil AG, Switzerland, in a thickness of 1.8 mm, was applied in an amount of 150 g/m², by means of heating to 180° C. melted, non-reactive hot melt adhesive SikaMelt®-9171, obtainable from Sika Automotive GmbH, Germany. After cooling off to room temperature, the adhesive coated flexible polyolefin film coated in this way was trimmed into 5×20 cm strips.

The adhesive coated flexible polyolefin film manufactured in this way was non-tacky at 23° C., as determined by spreading powdered chalk. When the foil was set upright, all the powdered chalk fell away from the surface of the adhesive, so that visually no chalk could any longer be discovered on the surface.

The adhesive coated flexible polyolefin film strips created in this way were laid on a concrete garden path plate and on a zinc plate, so that the adhesive coated side came into contact with the substrate to be glued. The strips were removed, and hot air was blown into the split by use of a heat gun or a flame so that the temperature measured in the adhesive was between 115° C. and 135° C.; it was then pressed into a 5 kg roll. Immediately after the cooling of the connection to room temperature, the peel resistance was measured with a tension testing machine (angle 90°, forward push speed 100 mm/min); this is given in table 1.

SikaMelt®-9171 has a softening point of 160° C., as measured by the ring and ball method according to DIN EN 1238, and a crossover temperature of 109° C., determined by DTMA according to the method described above.

TABLE 1

Peel resistance of glued substrata

|  | Heat gun | | Flame | |
| --- | --- | --- | --- | --- |
|  | Concrete | Zinc - tin | Concrete | Zinc - tin |
| Peel resistance (N/5 cm) | 90 | 366 | >100 | 413 |

REFERENCE SIGN LIST

1 Flexible polyolefin sealing film or sealing strip
2 Non-reactive hot melt adhesive compound
3 Hot melt coating polyolefin adhesive film
4 Surface
4' Surface coated with hot melt adhesive 2
5 Underground or above-ground construction
6 Split
7 Heat source
8 Coated connecting body
9 Roll
10 Applicator
11 Cooling agent

What is claimed is:

1. A composite, comprising:
   i) a layer of a polyolefin sealing film,
   ii) a layer of a non-reactive hot melt adhesive compound, and
   iii) an underground or above-ground construction,
   wherein the layer of the hot melt adhesive compound is disposed between the layer of the polyolefin sealing film and the underground or above-ground construction, and
   the underground or above-ground construction is selected from the group consisting of buildings, houses, tunnels and bridges.

2. The composite according to claim 1, wherein the underground or above-ground construction is a roof.

3. The composite according to claim 1, wherein the underground or above-ground construction is selected from the group consisting of supporting walls, and roofs.

4. The composite according to claim 1, wherein the underground or above-ground construction is a roof of a building or a house.

5. The composite according to claim 4, wherein the roof is a flat roof.

6. The composite according to claim 1, wherein the hot melt adhesive compound contains no polymers that chemically react with each other either at room temperature or at a melting point of the hot melt adhesive compound that would lead to a higher molecular species.

7. The composite according to claim 1, wherein the hot melt adhesive compound contains no isocyanate, alkoxysilane, epoxide, or (meth)acrylate groups.

8. The composite according to claim 1, wherein the hot melt adhesive compound contains no epoxy resin.

* * * * *